US012691497B2

(12) United States Patent
Hamburg

(10) Patent No.: US 12,691,497 B2
(45) Date of Patent: Jul. 28, 2026

(54) METHODS OF PRECISELY REGULATING A PROCESS GAS FLOW THROUGH A PROCESS CHAMBER OF AN ADDITIVE MANUFACTURING SYSTEM AND ADDITIVE MANUFACTURING SYSTEMS THAT PERFORM THE METHODS

(71) Applicant: The Boeing Company, Arlington, VA (US)

(72) Inventor: Dalton W. Hamburg, Bothell, WA (US)

(73) Assignee: The Boeing Company, Arlington, VA (US)

( * ) Notice: Subject to any disclaimer, the term of this patent is extended or adjusted under 35 U.S.C. 154(b) by 593 days.

(21) Appl. No.: 18/300,254

(22) Filed: Apr. 13, 2023

(65) Prior Publication Data

US 2024/0342799 A1     Oct. 17, 2024

(51) Int. Cl.
| | |
|---|---|
| *B22F 10/322* | (2021.01) |
| *B22F 12/70* | (2021.01) |
| *B22F 12/90* | (2021.01) |
| *B33Y 30/00* | (2015.01) |
| *B33Y 50/02* | (2015.01) |

(52) U.S. Cl.
CPC ............ *B22F 10/322* (2021.01); *B22F 12/70* (2021.01); *B22F 12/90* (2021.01); *B33Y 30/00* (2014.12); *B33Y 50/02* (2014.12); *B22F 2203/00* (2013.01)

(58) Field of Classification Search
CPC ..... B29C 45/18; B29C 64/364; B29C 64/371; B29C 64/393; B22F 10/31; B22F 10/32; B22F 10/322; B22F 10/85; B22F 12/70; B22F 12/90; B33Y 50/02
See application file for complete search history.

(56) References Cited

U.S. PATENT DOCUMENTS

2020/0061656 A1* 2/2020 Shalaby .................. B22F 10/77

OTHER PUBLICATIONS

Hoppe, B., S. Enk, and J. H. Schleifenbaum. "Analysis of the Shielding Gas Dependent L-PBF Process Stability by Means of Schlieren and Shadowgraph Techniques." 2019 International Solid Freeform Fabrication Symposium. University of Texas at Austin, 2019.

(Continued)

*Primary Examiner* — Vanessa T. Luk
(74) *Attorney, Agent, or Firm* — Kolitch Romano Dascenzo Gates LLP

(57) ABSTRACT

Methods of precisely regulating a process gas flow through a process chamber of an additive manufacturing system and related systems. The methods include positioning a removeable flow rate sensor to measure an actual bulk flow rate of the process gas flow and controlling the process gas flow to a desired bulk flow rate. The methods also include measuring the actual bulk flow rate with the removeable flow rate sensor, separating the removeable flow rate sensor from the process chamber, and comparing the actual bulk flow rate to the desired bulk flow rate. The methods further include proceeding with the additive manufacturing process or performing a corrective action and subsequently proceeding with the additive manufacturing process.

20 Claims, 5 Drawing Sheets

(56) References Cited

OTHER PUBLICATIONS

Ladewig, Alexander, et al. "Influence of the shielding gas flow on the removal of process by-products in the selective aser melting process." Additive Manufacturing 10 (2016): 1-9.

Philo, A. M., et al. "A Study into the Effects of Gas Flow Inlet Design of the Renishaw AM250 Laser Powder Bed Fusion Machine Using Computational Modeling." 2017 International Solid Freeform Fabrication Symposium. University of Texas at Austin, 2017.

Reijonen, Joni, et al. "On the effect of shielding gas flow on porosity and melt pool geometry in laser powder bed fusion additive manufacturing." Additive Manufacturing 32 (2020): 101030.

Schniedenharn, Maximilian, Frederik Wiedemann, and Johannes Henrich Schleifenbaum. "Visualization of the shielding gas flow in SLM machines by space-resolved thermal anemometry." Rapid Prototyping Journal 24.8 (2018): 1296-1304.

Shen, Haopeng, et al. "Influence of gas flow speed on laser plume attenuation and powder bed particle pickup in laser powder bed fusion." Jom 72.3 (2020): 1039-1051.

Tenbrock, Christian, et al. "Effect of laser-plume interaction on part quality in multi-scanner Laser Powder Bed Fusion." Additive Manufacturing 38 (2021): 101810.

Weaver, Jordan, et al. "Inert Gas Flow Speed Measurements in Laser Powder Bed Fusion Additive Manufacturing." (2021).

* cited by examiner

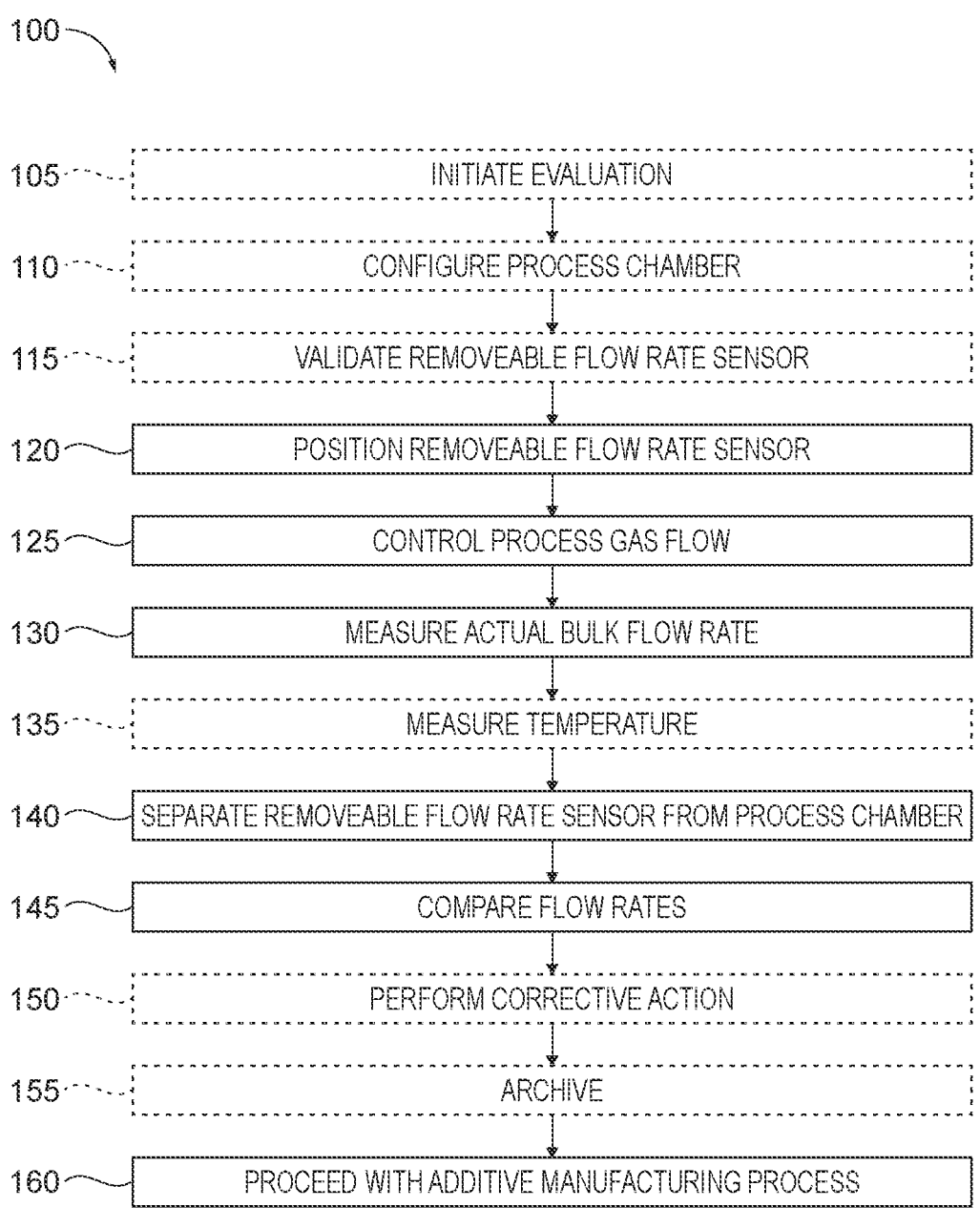

100

| 105 | INITIATE EVALUATION |
| 110 | CONFIGURE PROCESS CHAMBER |
| 115 | VALIDATE REMOVEABLE FLOW RATE SENSOR |
| 120 | POSITION REMOVEABLE FLOW RATE SENSOR |
| 125 | CONTROL PROCESS GAS FLOW |
| 130 | MEASURE ACTUAL BULK FLOW RATE |
| 135 | MEASURE TEMPERATURE |
| 140 | SEPARATE REMOVEABLE FLOW RATE SENSOR FROM PROCESS CHAMBER |
| 145 | COMPARE FLOW RATES |
| 150 | PERFORM CORRECTIVE ACTION |
| 155 | ARCHIVE |
| 160 | PROCEED WITH ADDITIVE MANUFACTURING PROCESS |

FIG. 2

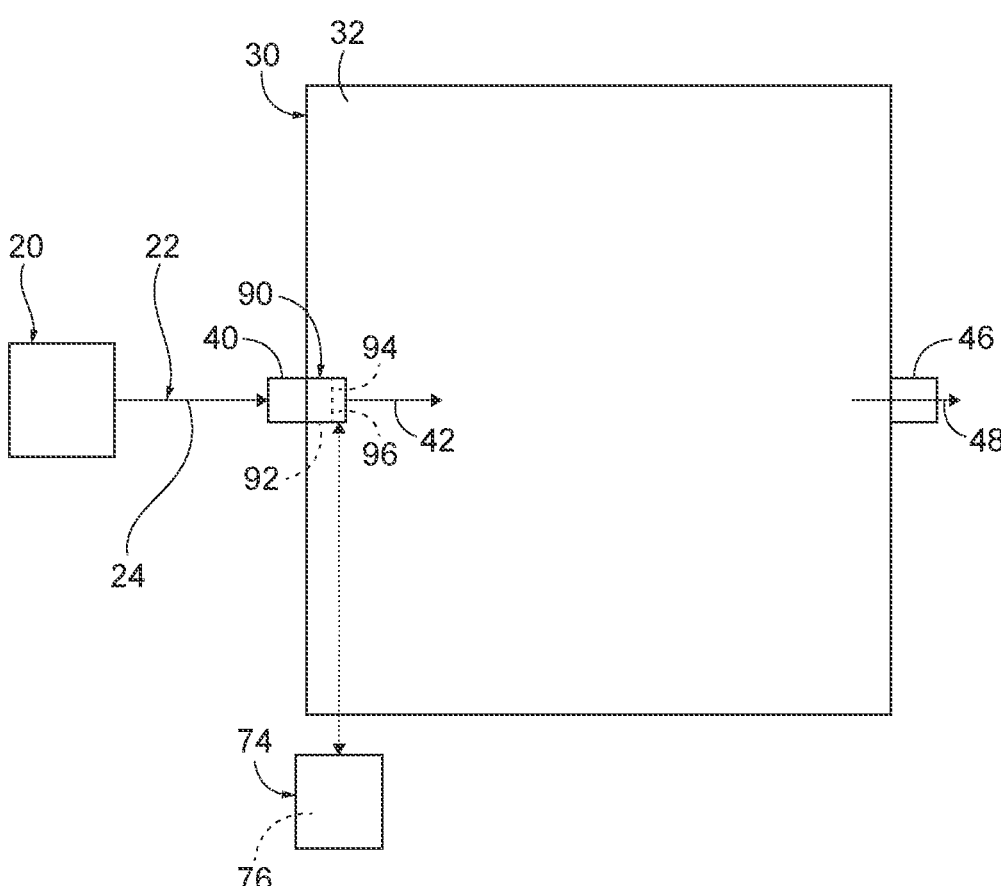
FIG. 3

METHODS OF PRECISELY REGULATING A PROCESS GAS FLOW THROUGH A PROCESS CHAMBER OF AN ADDITIVE MANUFACTURING SYSTEM AND ADDITIVE MANUFACTURING SYSTEMS THAT PERFORM THE METHODS

FIELD

The present disclosure relates generally to methods of precisely regulating a process gas flow through a process chamber of an additive manufacturing system and additive manufacturing systems that perform the methods.

BACKGROUND

Additive manufacturing systems may be utilized to form and/or define a manufactured component, or an additively manufactured component, from a feedstock material via an additive manufacturing process. Additive manufacturing systems thermally and/or chemically alter the feedstock material, within a specific 3-dimensional space, thereby causing the feedstock material to take on the shape of the manufactured component. An example of an additive manufacturing process is laser powder bed fusion. In laser powder bed fusion, a laser beam is utilized to selectively fuse regions of a layer of feedstock material, which takes the form of a powder. Subsequently, another layer of feedstock material is positioned and the selective fusion is repeated, thereby progressively defining the manufactured component.

In many additive manufacturing processes, it may be desirable to control and/or to regulate a local environment within which the additive manufacturing process is performed. In the example of laser powder bed fusion, the additive manufacturing process may be performed within a process chamber that may contain a process gas. A quality and/or a reproducibility of the additive manufacturing process may be impacted by a uniformity of process gas flow to and/or within the process chamber. Conventional additive manufacturing systems may not provide a desired level of control and/or reproducibility of this process gas flow. Additionally or alternatively, significant differences in process gas flow may be exhibited by otherwise identical additive manufacturing systems that are performing the same additive manufacturing process. This lack of control and/or reproducibility of process gas flow may cause undesired quality and/or reproducibility issues with the manufactured component. Thus, there exists a need for improved methods of precisely regulating a process gas flow through a process chamber of an additive manufacturing system, for improved additive manufacturing systems that perform the methods, and/or for storage media that directs additive manufacturing systems to perform the methods.

SUMMARY

Methods of precisely regulating a process gas flow through a process chamber of an additive manufacturing system and additive manufacturing systems that perform the methods are disclosed herein. The methods include positioning a removeable flow rate sensor to measure an actual bulk flow rate of the process gas flow through the process chamber. The methods also include controlling the process gas flow through the process chamber to a desired bulk flow rate by establishing the actual bulk flow rate of the process gas flow through the process chamber. The methods further include measuring the actual bulk flow rate of the process gas flow through the process chamber with the removeable flow rate sensor. The methods also include separating the removeable flow rate sensor from the process chamber. The methods further include comparing the actual bulk flow rate to the desired bulk flow rate. Responsive to the actual bulk flow rate being within a threshold flow rate differential of the desired bulk flow rate, the methods also include proceeding with the additive manufacturing process. Alternatively, and responsive to the actual bulk flow rate differing from the desired bulk flow rate by greater than the threshold flow rate differential, the methods also include performing a corrective action and subsequently proceeding with the additive manufacturing process.

BRIEF DESCRIPTION OF THE DRAWINGS

FIG. 2 is a flowchart depicting examples of methods of precisely regulating a process gas flow through a process gas chamber, according to the present disclosure.

FIG. 3 is a schematic illustration of a portion of the additive manufacturing system of FIG. 1 that emphasizes components utilized during a subset of the methods of FIG. 2.

DESCRIPTION

Figure 1:
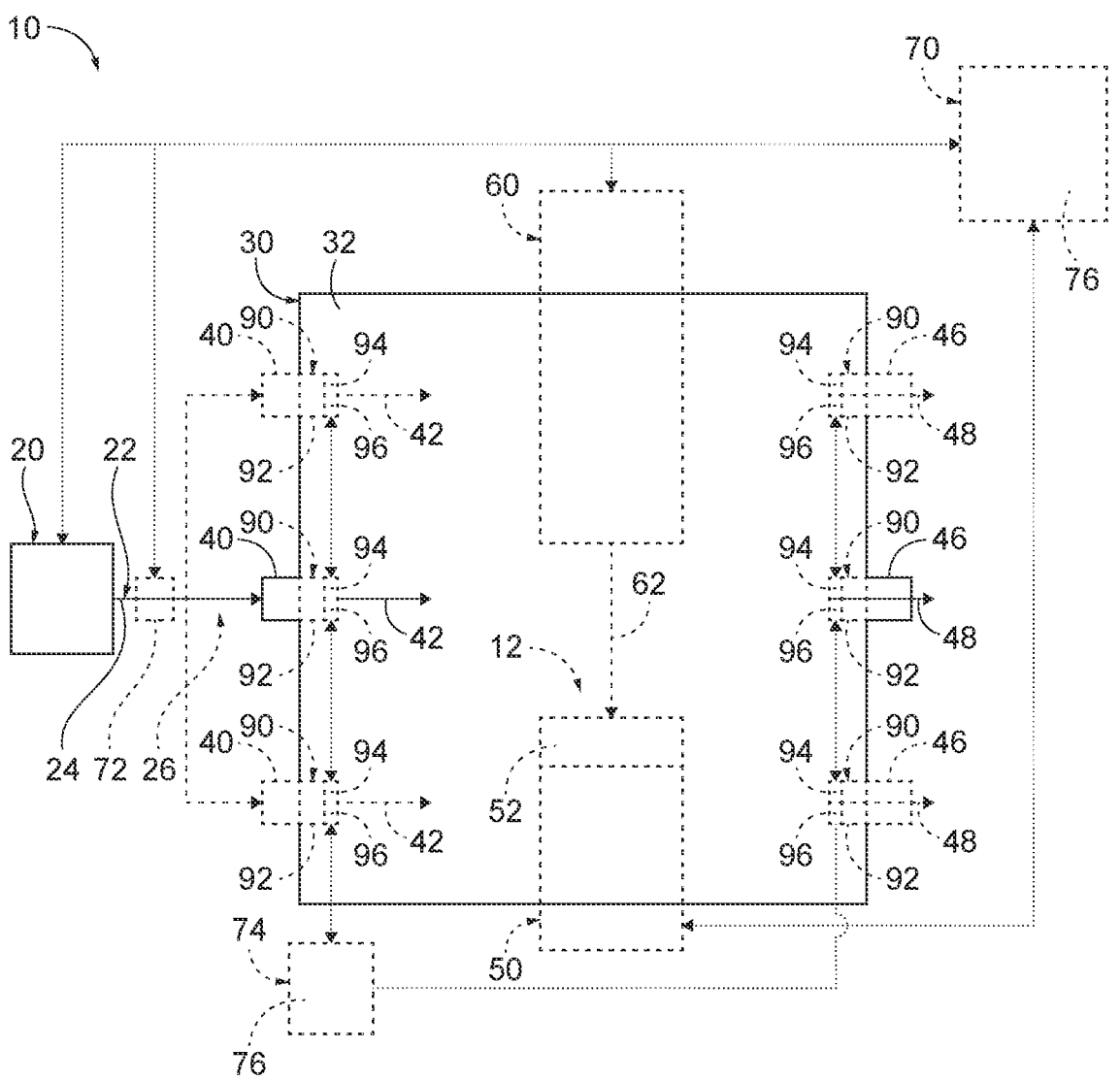
FIG. 1 is a schematic illustration of examples of an additive manufacturing system according to the present disclosure.

FIGS. 1-5 provide illustrative, non-exclusive examples of additive manufacturing systems 10 and/or of methods 100 according to the present disclosure. Elements that serve a similar, or at least substantially similar, purpose are labeled with like numbers in each of FIGS. 1-5, and these elements may not be discussed in detail herein with reference to each of FIGS. 1-5. Similarly, all elements may not be labeled in each of FIGS. 1-5, but reference numerals associated therewith may be utilized herein for consistency. Elements, components, and/or features that are discussed herein with reference to one or more of FIGS. 1-5 may be included in and/or utilized with any of FIGS. 1-5 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

Figure 4:
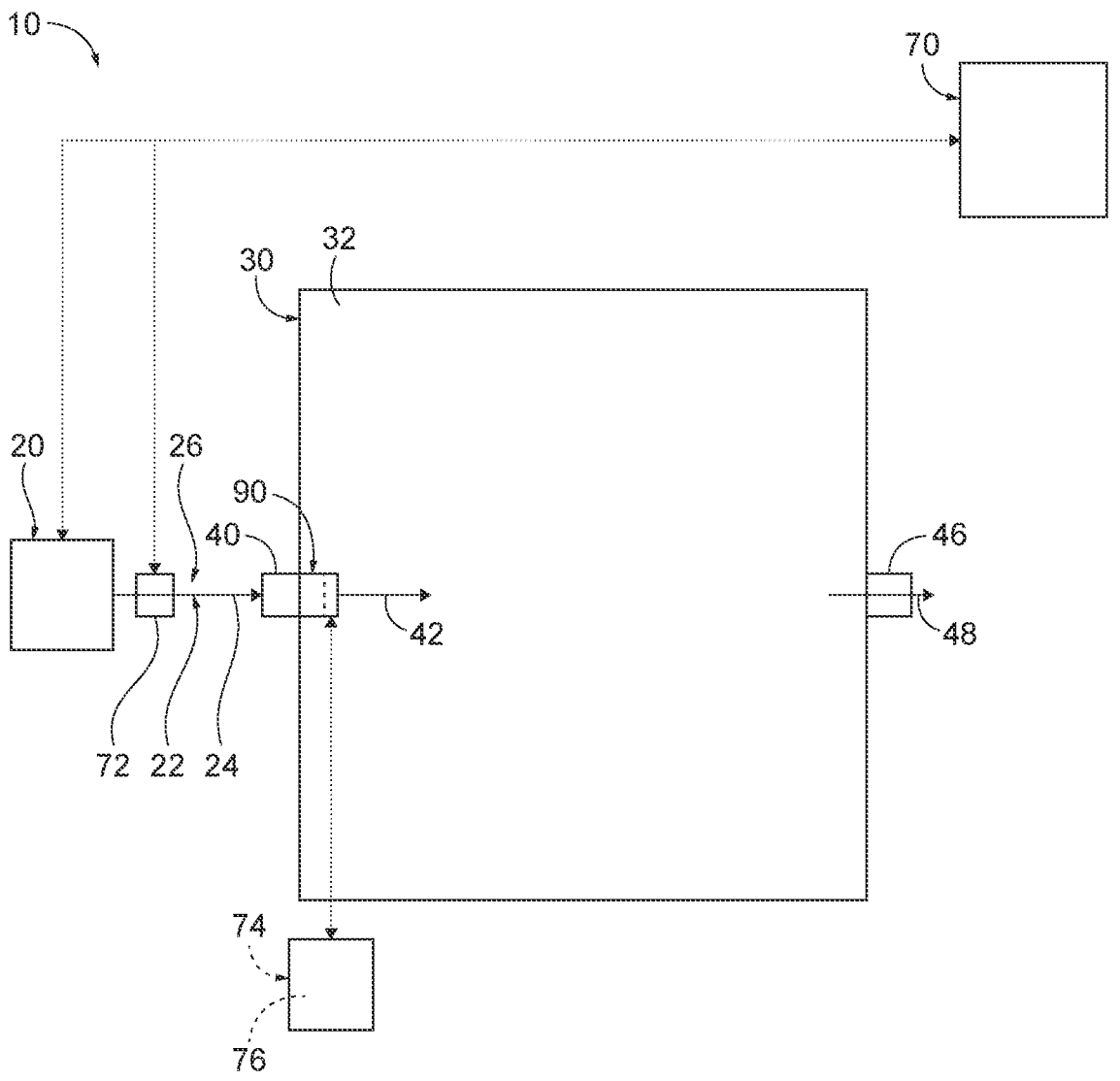
FIG. 4 is a schematic illustration of a portion of the additive manufacturing system of FIG. 1 that emphasizes components utilized during a subset of the methods of FIG. 2.
Figure 5:
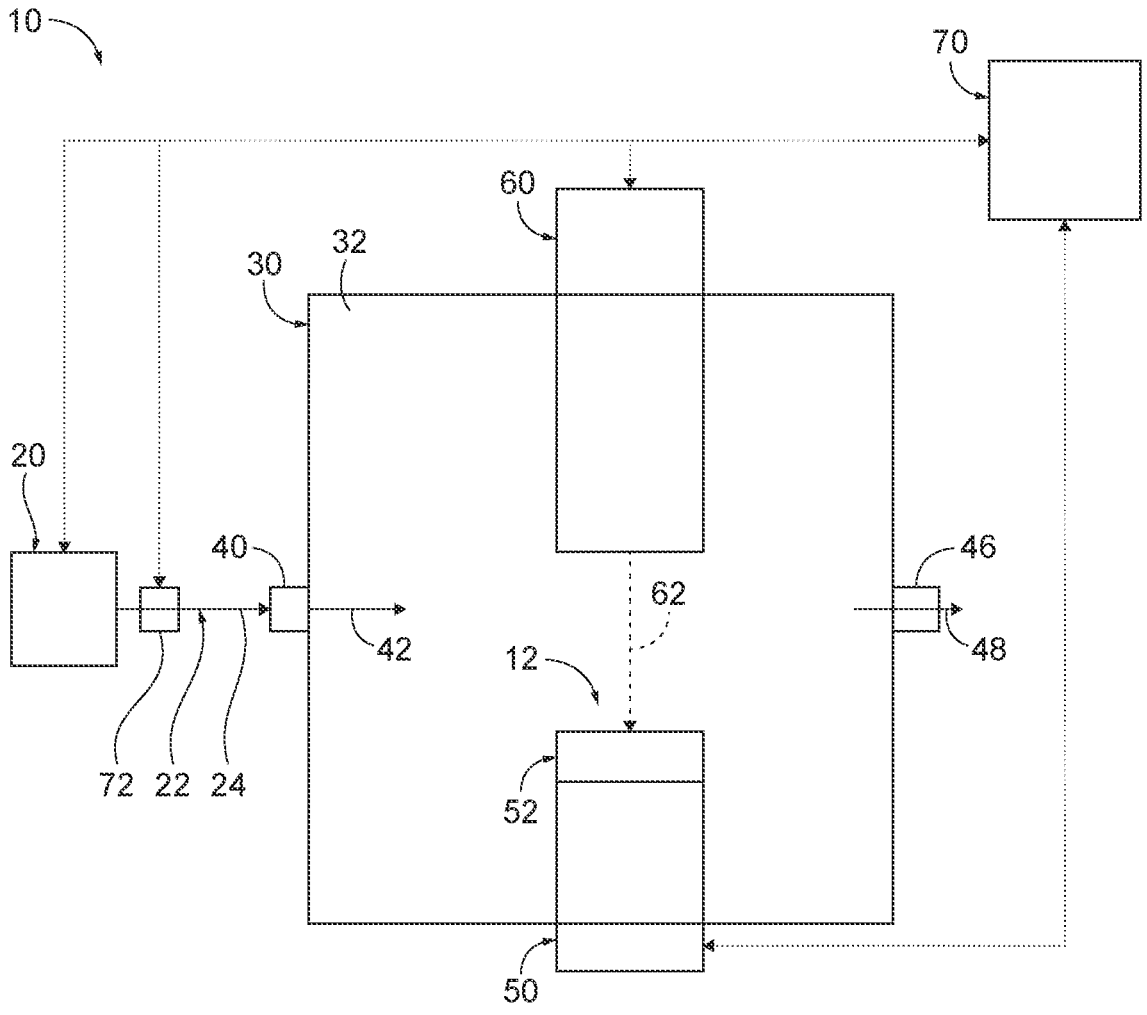
FIG. 5 is a schematic illustration of a portion of the additive manufacturing system of FIG. 1 that emphasizes components utilized during a subset of the methods of FIG. 2.

FIG. 1 is a schematic illustration of examples of an additive manufacturing system 10 according to the present disclosure. FIGS. 3-5 are schematic illustrations of portions of additive manufacturing system 10 of FIG. 1 that emphasizes components utilized during a subset of methods 100 of FIG. 2. For simplicity, the following discussions generally will refer to FIG. 1. However, discussions of various components and/or functions of additive manufacturing systems 10 also are applicable to any one of FIGS. 3-5, as appropriate.

Additive manufacturing systems 10 may be adapted, configured, designed, and/or constructed to additively manufacture a manufactured component 12. As illustrated in solid lines in FIG. 1, additive manufacturing systems 10 include a process gas source 20, which may be configured to produce and/or to provide a process gas flow 22 of a process gas 24. As also illustrated in solid lines in FIG. 1, additive manufacturing systems 10 include a process chamber 30 that defines an enclosed chamber volume 32. Process chamber 30 also includes and/or defines at least one process gas inlet 40, such as may be configured to receive an inflow 42 of process gas 24 into enclosed chamber volume 32, and at least one process gas outlet 46, such as may be configured to discharge an outflow 48 of process gas 24 from enclosed chamber volume 32.

Process gas source 20 may include any suitable structure that may be adapted, configured, designed, and/or constructed to produce, to generate, and/or to provide process gas flow 22. Examples of process gas source 20 include a volume, a tank, and/or a cylinder of process gas 24. Additional examples of process gas source 20 include a valve, a needle valve, a flapper, and/or a rotameter, such as may be configured to control and/or to regulate a flow rate of process gas flow 22. Examples of process gas 24 include a shielding gas, a noble gas, helium, argon, and/or carbon dioxide. In some examples, process gas 24 may exclude, or at least substantially exclude, atmospheric air and/or oxygen.

Additive manufacturing systems 10 also may include and/or may be utilized with a feedstock material supply system 50, as illustrated in dashed lines in FIG. 1. Feedstock material supply system 50 may be adapted, configured, designed, and/or constructed to supply a feedstock material 52 to and/or within enclosed chamber volume 32.

Feedstock material supply system 50 may include any suitable structure that may be adapted, configured, designed, and/or constructed to supply feedstock material 52. Examples of feedstock material supply system 50 include a powder supply system and/or a filament supply system. Examples of feedstock material 52 include a feedstock powder, a metallic powder, a feedstock filament, and/or a metallic filament.

Additive manufacturing systems 10 further may include and/or may be utilized with an energy source 60, as illustrated in dashed lines in FIG. 1. Energy source 60 may be adapted, configured, designed, and/or constructed to fuse feedstock material 52, within enclosed chamber volume 32, to form and/or define manufactured component 12, such as via application of energy 62 to feedstock material 52.

Energy source 60 may include any suitable structure that may be adapted, configured, designed, and/or constructed to apply energy 62 to feedstock material 52, to selectively apply energy 62 to feedstock material 52, and/or to apply energy 62 to a specified portion and/or region of feedstock material 52. Examples of energy source 60 include an electric current source, an electric voltage source, a heat source, an electromagnetic radiation source, and/or a laser.

Additive manufacturing system 10 also may include a process control system 70, as illustrated in dashed lines in FIG. 1. Process control system 70 may include a machine flow rate sensor 72, which may be adapted, configured, designed, and/or constructed to measure a measured flow velocity of process gas flow 22, such as within a supply line that provides the process gas flow to process chamber 30.

During at least a portion of a time period during which methods 100 are performed by, within, and/or utilizing additive manufacturing systems 10, additive manufacturing systems 10 also include at least one removeable flow rate sensor 90, which may be configured to measure a bulk flow rate of process gas flow 22 through process chamber 30. Removeable flow rate sensor 90 is illustrated in dashed lines in FIG. 1 to indicate that the removeable flow rate sensor only temporarily may be included in and/or utilized with additive manufacturing systems 10.

In some examples of additive manufacturing systems 10, process chamber 30 may include a plurality of process gas inlets 40. In such examples, a corresponding removeable flow rate sensor 90 may be associated with, may be temporarily associated with, and/or may be configured to measure a corresponding inflow 42 though each process gas inlet 40 of the plurality of process gas inlets, as illustrated in dashed lines in FIG. 1. Additionally or alternatively, and in some examples of additive manufacturing systems 10, process chamber 30 may include a plurality of process gas outlets 46. In such examples, a corresponding removeable flow rate sensor 90 may be associated with, may be temporarily associated with, and/or may be configured to measure a corresponding outflow 48 through each process gas outlet 46 of the plurality of process gas outlets, as illustrated in dashed lines in FIG. 1. Regardless of the exact configuration of process chamber 30, including the exact number of process gas inlets 40 and/or the exact number of process gas outlets 46, removeable flow rate sensors 90 generally will be positioned to measure all inflow(s) 42 into and/or all outflow(s) 48 from enclosed chamber volume 32.

Removeable flow rate sensor 90 may include any suitable structure that may be adapted, configured, designed, and/or constructed to measure the bulk flow rate of process gas flow 22 through process chamber 30 and/or through enclosed chamber volume 32 thereof. As an example, removeable flow rate sensor 90 may include a bulk flow rate sensor 94, such as may be configured to measure a bulk flow rate, a volumetric flow rate, and/or a mass flow rate of process gas flow 22. A specific example of bulk flow rate sensor 94 includes a vane anemometer. In some examples, removeable flow rate sensor 90 also may include and/or utilize a temperature sensor 96, such as may be configured to measure a temperature of a corresponding inflow 42 or outflow 48. In such a configuration, bulk flow rate sensor 94 may be configured to measure the volumetric flow rate of process gas flow 22, and additive manufacturing system 10 may be configured to calculate the mass flow rate of process gas flow 22 based, at least in part, on the bulk flow rate of the process gas flow and the temperature of the process gas flow. Bulk flow rate sensor 94 may be positioned within enclosed chamber volume 32.

In some examples, removeable flow rate sensor 90 also may include a removeable duct 92. Removeable duct 92 may be configured to direct process gas flow 22, the corresponding inflow 42, and/or the corresponding outflow 48 through bulk flow rate sensor 94. Stated differently, removeable duct 92 may be utilized to capture an entirety, or at least substantially the entirety, of a given inflow 42 or outflow 48 and direct the entirety of the given inflow 42 or outflow 48 to a corresponding bulk flow rate sensor 94.

During a portion of the time period during which methods 100 are performed by, within, and/or utilizing additive manufacturing systems 10 and/or when additive manufacturing systems 10 include the at least one removeable flow rate sensor 90, the additive manufacturing systems also may include a data acquisition unit 74. Data acquisition unit 74 may be programmed to communicate with removeable flow rate sensor 90, such as to receive the bulk flow rate as measured by removeable flow rate sensor 90 and/or to store the bulk flow rate for later analysis and/or utilization. In some examples, data acquisition unit 74 may be separate and/or distinct from process control system 70; however, this is not required of all examples.

Process control system 70 may include any suitable structure that may be adapted, configured, designed, and/or constructed to perform the functions disclosed herein. Similarly, data acquisition unit 74 may include any suitable structure that may be adapted, configured, designed, and/or constructed to perform the functions disclosed herein. As examples, process control system 70 and/or data acquisition unit 74 may include one or more of an electronic controller, a dedicated controller, a special-purpose controller, a personal computer, a special-purpose computer, a display device, a logic device, a memory device, and/or a memory device having computer-readable storage media 76.

Computer-readable storage media 76, when present, also may be referred to herein as non-transitory computer readable storage media 76. This non-transitory computer readable storage media may include, define, house, and/or store computer-executable instructions, programs, and/or code; and these computer-executable instructions may direct additive manufacturing system 10, such as via process control system 70 and/or data acquisition unit 74 thereof, to perform any suitable portion, or subset, of methods 100. Examples of such non-transitory computer-readable storage media include CD-ROMs, disks, hard drives, flash memory, etc. As used herein, storage, or memory, devices and/or media having computer-executable instructions, as well as computer-implemented methods and other methods according to the present disclosure, are considered to be within the scope of subject matter deemed patentable in accordance with Section 101 of Title 35 of the United States Code.

During operation of additive manufacturing systems 10, and as discussed in more detail herein with reference to methods 100 of FIG. 2, removeable flow rate sensor 90 may be positioned to measure an actual bulk flow rate of process gas flow 22 through process chamber 30 and/or through enclosed chamber volume 32 thereof. This may include positioning a corresponding removeable flow rate sensor 90 at, or to measure a corresponding inflow 42 through, each, or every, process gas inlet 40 of process chamber 30. Additionally or alternatively, this may include positioning a corresponding removeable flow rate sensor 90 at, or to measure a corresponding outflow 48 through, each, or every, process gas outlet 46 of process chamber 30.

Process control system 70 then may be utilized to establish and/or to control process gas flow 22 through process chamber 30 to a desired bulk flow rate. As an example, process control system 70 may utilize machine flow rate sensor 72 to measure a measured flow velocity of process gas flow 22, such as within a supply conduit 26 that provides process gas flow 22 from process gas source 20 to process chamber 30, and may utilize process gas source 20 to regulate the flow rate of process gas flow 22 based upon the measured flow velocity of process gas flow 22. An example of machine flow rate sensor 72 includes a differential pressure sensor.

However, the desired bulk flow rate may differ from an actual, or a real, bulk flow rate of process gas flow 22, such as may be due to inadequacies of machine flow rate sensor 72, a location of machine flow rate sensor 72, a lack of calibration of machine flow rate sensor 72, and/or machine-to-machine variations for different additive manufacturing systems 10 that utilize process control system 70, or the same process control system 70.

As such, removeable flow rate sensor 90 concurrently may be utilized to measure the actual bulk flow rate of process gas flow 22. As discussed in more detail herein, removeable flow rate sensor 90 may be significantly more accurate at measuring the actual flow rate of process gas flow 22 when compared to machine flow rate sensor 72. This increase in accuracy may be due to a variety of factors, including a type of flow sensor utilized in removeable flow rate sensor 90 when compared to machine flow rate sensor 72, the location of removeable flow rate sensor 90 within additive manufacturing system 10 when compared to the location of machine flow rate sensor 72, and/or one or more validation and/or calibration procedures that readily may be performed on removeable flow rate sensor 90 but that may be difficult and/or not feasible to perform on machine flow rate sensor 72.

Subsequently, removeable flow rate sensor 90 may be removed from additive manufacturing system 10. In addition, the actual bulk flow rate, as measured by removeable flow rate sensor 90, may be compared to the desired bulk flow rate, as targeted by process control system 70 to ascertain the accuracy of flow control provided by process control system 70. If the actual bulk flow rate is sufficiently close to the desired bulk flow rate, the additive manufacturing system then may be utilized to perform the additive manufacturing process, such as to form manufactured component 12. Alternatively, if the actual bulk flow rate differs from the desired bulk flow rate by more than a threshold flow rate differential, a corrective action may be performed before the additive manufacturing systems is utilized to perform the additive manufacturing process.

FIG. 2 is a flowchart depicting examples of methods 100 of precisely regulating a process gas flow through a process gas chamber, according to the present disclosure, while FIGS. 3-5 are schematic illustrations of portions of additive manufacturing system 10 of FIG. 1 that emphasize components utilized during a subset of methods 100 of FIG. 2. The process chamber may define an enclosed chamber volume, which contains and/or is configured to contain an additive manufacturing process. The process chamber also may define a process gas inlet to the enclosed chamber volume and a process gas outlet from the enclosed chamber volume. Examples of the additive manufacturing process are disclosed herein. Examples of the process gas flow are disclosed herein with reference to process gas flow 22. Examples of the process chamber and the enclosed chamber volume are disclosed herein with reference to process chamber 30 and enclosed chamber volume 32, respectively. Examples of the process gas inlet and the process gas outlet are disclosed herein with reference to process gas inlet 40 and process gas outlet 46, respectively.

Methods 100 may include initiating evaluation at 105, configuring a process chamber at 110, and/or validating a removeable flow rate sensor at 115. Methods 100 include positioning the removable flow rate sensor at 120, controlling the process gas flow at 125, and measuring an actual bulk flow rate at 130 and may include measuring a temperature at 135. Methods 100 also include separating the removeable flow rate sensor at 140 and comparing flow rates at 145. Methods 100 also may include performing a corrective action at 150 and/or archiving at 155, and proceeding with an additive manufacturing process at 160.

Initiating evaluation at 105 may include initiating evaluation of the additive manufacturing system, initiating evaluation of an accuracy of a process control system thereof, and/or initiating evaluation of the additive manufacturing process. Examples of the process control system are disclosed herein with reference to process control system 70. The initiating at 105 may be based upon and/or responsive to any suitable criteria. As examples, the initiating at 105 may be based, at least in part, on initial setup of a new additive manufacturing system that includes the process chamber and performs the additive manufacturing process, an elapsed manufacturing time for an existing additive manufacturing system that includes the process chamber and performs the additive manufacturing process, initiation of a new additive manufacturing process that utilizes a desired bulk flow rate for the process gas flow through the process chamber, and/or detection of an undesired defect in an additively manufactured component manufactured utilizing the desired bulk flow rate of the process gas flow. When methods 100 include the initiating at 105, the positioning at 120 may be responsive to and/or a result of the initiating at 105.

The initiating at 105 may be performed with any suitable timing and/or sequence during methods 100. As examples, the initiating at 105 may be performed prior to and/or may cause initiation of the configuring at 110, the validating at 115, the positioning at 120, the controlling at 125, the measuring at 130, the measuring at 135, the separating at 140, the comparing at 145, the performing at 150, the archiving at 155, and/or the proceeding at 160.

Prior to the controlling at 125, methods 100 may include configuring the process chamber at 110. The configuring at 110 may include configuring the process chamber for, or to perform, the additive manufacturing process and/or configuring the process chamber for, or to perform, one or more subsequent steps of methods 100. Examples of the configuring at 110 include cleaning the process chamber and/or loading desired settings for the additive manufacturing process, such as on the process control system. The desired settings may include the desired bulk flow rate.

Prior to the measuring at 130 and/or prior to the positioning at 120, methods 100 may include validating the removeable flow rate sensor at 115. The validating at 115 may include validating operation and/or accuracy of the removeable flow rate sensor and may be performed in any suitable manner. As examples, the validating at 115 may include testing operation of the removeable flow rate sensor, calibrating the removeable flow rate sensor, and/or certifying calibration of the removeable flow rate sensor. The validating at 115 may be utilized to ensure that the removeable flow rate sensor accurately and/or precisely measures the actual bulk flow rate during the measuring at 130. Examples of the removeable flow rate sensor are disclosed herein with reference to removeable flow rate sensor 90.

Positioning the removable flow rate sensor at 120 may include positioning the removeable flow rate sensor to measure an actual bulk flow rate of the process gas flow through the process chamber. As used herein, the phrase "actual bulk flow rate" refers to any suitable direct volumetric and/or mass flow rate measurement of an entirety, or at least substantially the entirety, of the process gas flow to, into, and/or from the enclosed chamber volume of the process chamber. The phrase "actual bulk flow rate" excludes point flow velocity measurements, which may be utilized to indirectly calculate a calculated flow rate of the process gas flow.

The positioning at 120 may include positioning the removeable flow rate sensor at any suitable location and/or locations within additive manufacturing system 10. This may include positioning a single bulk flow rate sensor or a plurality of distinct bulk flow rate sensors.

As an example, the positioning at 120 may include positioning to measure all, or at least substantially all, inflow of the process gas flow into the enclosed chamber volume via the process gas inlet. As another example, and when the process gas chamber includes a plurality of process gas inlets, the positioning at 120 may include positioning a corresponding removeable flow rate sensor to measure a corresponding inflow of the process gas flow through each process gas inlet of the plurality of process gas inlets. Stated differently, the positioning at 120 includes positioning to measure at least 80%, at least 85%, at least 90%, at least 95%, at least 99%, or 100% of the inflow of the process gas flow into the enclosed chamber volume.

Additionally or alternatively, the positioning at 120 may include positioning to measure all, or at least substantially all, outflow of the process gas flow from the enclosed chamber volume via the process gas outlet. As another example, and when the process gas chamber includes a plurality of process gas outlets, the positioning at 120 may include positioning a corresponding removeable flow rate sensor to measure a corresponding outflow of the process gas flow through each process gas outlet of the plurality of process gas outlets. Stated differently, the positioning at 120 includes positioning to measure at least 80%, at least 85%, at least 90%, at least 95%, at least 99%, or 100% of the outflow of the process gas flow from the enclosed chamber volume.

In some examples, and as discussed, the removeable flow rate sensor may include a removeable duct and a bulk flow rate sensor. In such examples, the positioning at 120 may include positioning the removeable duct to direct the process gas flow through the bulk flow rate sensor. Examples of the removeable duct are disclosed herein with reference to removeable duct 92. Examples of the bulk flow rate sensor are disclosed herein with reference to bulk flow rate sensor 94.

The positioning at 120 may be performed with any suitable timing and/or sequence during methods 100. As examples, the positioning at 120 may be performed subsequent and/or responsive to the initiating at 105. As additional examples, the positioning at 120 may be performed prior to, subsequent to, and/or at least partially concurrently with the configuring at 110, the validating at 115, and/or the controlling at 125. As further examples, the positioning at 120 may be performed prior to the measuring at 130, the measuring at 135, the separating at 140, the comparing at 145, the performing at 150, the archiving at 155, and/or the proceeding at 160.

A specific example of the positioning at 120 is illustrated in FIG. 3. As illustrated therein, a process chamber 30 includes a single process gas inlet 40 that provides a single inflow 42 of process gas flow 22 into enclosed chamber volume 32. As also illustrated, process chamber 30 includes a single process gas outlet 46 that discharges a single outflow 48 of process gas flow 22 from enclosed chamber volume 32. In this example, a single removeable flow rate sensor 90 is positioned within enclosed chamber volume 32 to measure an entirety of inflow 42 into the enclosed chamber volume.

Controlling the process gas flow at 125 may include controlling the process gas flow through the process gas chamber to a desired bulk flow rate. This may include controlling the process gas flow with, via, and/or utilizing a process control system of the additive manufacturing process and/or may include establishing the actual bulk flow rate of the process gas flow through the process chamber. As discussed in more detail herein, the actual bulk flow rate may differ from the desired bulk flow rate, such as may be caused by inaccuracies in process gas flow control by the process control system.

The controlling at 125 may be accomplished in any suitable manner. As an example, the controlling at 125 may include measuring a measured flow velocity of the process gas flow, utilizing a machine flow rate sensor of the process control system, and regulating the process gas flow to the desired bulk flow rate based, at least in part, on the measured flow velocity of the process gas flow. The measuring the measured flow velocity may include performing a point measurement of the measured flow velocity at a measurement location, or a single measurement location. The measurement location may be within the process chamber, within the process gas inlet, within the process gas outlet, and/or within a supply conduit that provides the process gas flow from a process gas source to the process gas inlet. Examples of the machine flow rate sensor are disclosed herein with reference to machine flow rate sensor 72. Examples of the supply conduit are disclosed herein with reference to supply conduit 26. Examples of the process gas source are disclosed herein with reference to process gas source 20.

The regulating the process gas flow may be performed in any suitable manner. As an example, the regulating the process gas flow may be performed with, via, and/or utilizing the process gas source. As additional examples, the regulating the process gas flow may be performed utilizing a flow-regulating device, such as a valve, a flapper, and/or a pressure regulator, which may form a portion of the process control system and/or of the process gas source.

The controlling at 125 may include providing the process gas flow to the process gas inlet and discharging the process gas flow from the process gas outlet, such as to flush and/or to purge the enclosed chamber volume with a process gas that comprises the process gas flow. Examples of the process gas are disclosed herein with respect to process gas 24.

The controlling at 125 may be performed with any suitable timing and/or sequence during methods 100. As examples, the controlling at 125 may be performed subsequent to and/or responsive to the initiating at 105. As additional examples, the controlling at 125 may be performed prior to, subsequent, to, and/or at least partially concurrently with the configuring at 110, the validating at 115, the positioning at 120, the measuring at 130, and/or the measuring at 135. As further examples, the controlling at 125 may be performed prior to the separating at 140, the comparing at 145, the performing at 150, the archiving at 155, and/or the proceeding at 160.

A specific example of the controlling at 125 is illustrated in FIG. 4. As illustrated therein, a process control system 70, including machine flow rate sensor 72 thereof, is utilized to control and/or regulate the flow rate of process gas flow 22 through enclosed chamber volume 32 of process chamber 30. This includes control of the flow rate of process gas flow 22 to the desired bulk flow rate, as may be measured and/or estimated by machine flow rate sensor 72, and establishing the actual bulk flow rate of the process gas flow through the process chamber. As discussed in more detail herein, the actual bulk flow rate may, but is not required to, differ from the desired bulk flow rate. Process gas flow 22 enters enclosed chamber volume 32 as inflow 42 and/or via process gas inlet 40 and exits enclosed chamber volume 32 as outflow 48 and/or via process gas outlet 46. Similar to FIG. 3, in this example, process chamber 30 includes a single process gas inlet 40 and a single process gas outlet 46; however, this is not required of all examples.

During the controlling at 125, methods 100 also include measuring the actual bulk flow rate at 130. The measuring at 130 may include measuring the actual bulk flow rate of the process gas flow with, via, and/or utilizing the removeable flow rate sensor. This may include measuring, or directly measuring, a volumetric flow rate of the process gas flow and/or a mass flow rate of the process gas flow.

This may include measuring all, or at least substantially all, inflow of the process gas flow into the enclosed chamber volume and/or via the process gas inlet. When the process chamber includes the plurality of process gas inlets, the measuring at 130 may include measuring a corresponding actual bulk flow rate of a corresponding inflow of the process gas through each process gas inlet of the plurality of process gas inlets.

Additionally or alternatively, the measuring at 130 may include measuring all, or at least substantially all, outflow of the process gas flow from the enclosed chamber volume and/or via the process gas outlet. When the process chamber includes the plurality of process gas outlets, the measuring at 130 may include measuring a corresponding actual bulk flow rate of a corresponding outflow of the process gas through each process gas outlet of the plurality of process gas outlets.

A specific example of the measuring at 130 is illustrated in FIG. 4. In the specific example that is illustrated therein, removeable flow rate sensor 90 is utilized to measure an entirety of inflow 42 though a single process gas inlet 40 of process chamber 30. As also illustrated in FIG. 4, and discussed in more detail herein, a data acquisition unit 74 may be in communication with removeable flow rate sensor 90 and/or may receive flow information from the removeable flow rate sensor.

Measuring the temperature at 135 may include measuring the temperature of the process gas flow. This may include measuring the temperature with, via, and/or utilizing a temperature sensor of the removeable flow rate sensor. Examples of the temperature sensor are disclosed herein with reference to temperature sensor 96. In some examples, and when methods 100 include the measuring at 135, the measuring at 130 may include measuring the volumetric flow rate of the process gas flow, and methods 100 further may include calculating the mass flow rate of the process gas flow based, at least in part, on the temperature of the process gas flow and the volumetric flow rate of the process gas flow.

The measuring at 135 may be performed with any suitable timing and/or sequence during methods 100. As examples, the measuring at 135 may be performed at least partially concurrently with and/or during the measuring at 130.

Subsequent to the measuring at 130, methods 100 also include separating the removeable flow rate sensor at 140. The separating at 140 may include separating the removeable flow rate sensor from the process chamber. This may include demounting the removeable flow rate sensor from the process chamber, removing the removeable flow rate sensor from the enclosed chamber volume, and/or establishing a spaced-apart relationship between the removeable flow rate sensor and the process chamber and/or the enclosed chamber volume. When the removeable flow rate sensor includes the removable duct and/or the bulk flow rate sensor, the separating at 140 may include separating the removable duct and/or the bulk flow rate sensor from the process chamber. When the positioning at 120 include positioning the plurality of distinct removable flow rate sensors, the separating at 140 may include separating the plurality of distinct removeable flow rate sensors from the process chamber.

The separating at 140 may be performed with any suitable timing and/or sequence during methods 100. As examples, the separating at 140 may be performed subsequent to the initiating at 105, the configuring at 110, the validating at 115, the positioning at 120, the controlling at 125, the measuring at 130, and/or the measuring at 140. As additional examples, the separating at 140 may be performed prior to the proceeding at 160. As further examples, the separating at 140 may be performed prior to, at least partially concurrently with, and/or subsequent to the comparing at 145, the performing at 150, and/or the archiving at 155.

The separating at 140 is illustrated by the transition from the configuration that is illustrated in FIG. 4 to the configuration that is illustrated in FIG. 5. In particular, and subsequent to the separating at 140, FIG. 5 illustrates that removeable flow rate sensor 90 of FIG. 4 no longer is positioned to measure inflow 42 and/or outflow 48.

Subsequent to the measuring at 130, methods 100 also include comparing flow rates at 145. The comparing at 145 may include comparing the actual bulk flow rate to the desired bulk flow rate. This may be performed in any suitable manner. As examples, the comparing at 145 may include comparing a magnitude of the actual bulk flow rate to a magnitude of the desired bulk flow rate, calculating a ratio between the desired bulk flow rate and the actual bulk flow rate, determining a difference between the actual bulk flow rate and the desired bulk flow rate, and/or determining an absolute value of the difference between the desired bulk flow rate and the actual bulk flow rate.

The comparing at 145 may be performed with any suitable timing and/or sequence during methods 100. As examples, the comparing at 145 may be performed subsequent to the initiating at 105, the configuring at 110, the validating at 115, and/or the positioning at 120. As additional examples, the comparing at 145 may be performed subsequent to and/or at least partially concurrently with the controlling at 125, the measuring at 130, the measuring at 135, and/or the separating at 140. As further examples, the comparing at 145 may be performed prior to, at least partially concurrently with, and/or subsequent to the performing at 150 and/or the archiving at 155. As an additional example, the comparing at 145 may be performed prior to the proceeding at 160.

Responsive to the comparing at 145 indicating that the actual bulk flow rate differs from the desired bulk flow rate by greater than the threshold flow rate differential, methods 100 may include performing the corrective action at 150. The performing at 150 may include performing any suitable corrective action, such as may cause the actual bulk flow rate to be within the threshold flow rate differential of the desired bulk flow rate when the process control system controls the process gas flow to the desired bulk flow rate.

As an example, the performing at 150 may include performing a root-cause analysis to ascertain a cause for the actual bulk flow rate differing from the desired bulk flow rate by greater than the threshold flow rate differential. Upon and/or responsive to identification of the cause, the performing at 150 also may include mitigating and/or removing the cause. As another example, the performing at 150 may include adjusting a calibration of the process control system and/or of the machine flow rate sensor. This may include adjusting one or more scale and/or offset parameters of the machine flow rate sensor and/or that are utilized, by the process control system, to interpret information from the machine flow rate sensor.

Archiving at 155 may include storing and/or archiving any suitable information obtained, determined, measured, and/or calculated during methods 100. As examples, the archiving at 155 may include archiving one or more of the desired bulk flow rate, the actual bulk flow rate, the measured flow velocity of the process gas flow, an identifier, or a unique identifier, for the removeable flow rate sensor, and/or the corrective action. The archiving at 155 may permit and/or facilitate identification of trends in measured flow velocity as measured by the machine flow rate sensor and/or in the actual bulk flow rate as measured by the removeable flow rate sensor. Additionally or alternatively, the archiving at 155 may permit and/or facilitate improved matching among a plurality of additive manufacturing systems that may perform methods 100.

Responsive to the comparing at 145 indicating that the actual bulk flow rate is within the threshold flow rate differential of the desired bulk flow rate, methods 100 may include proceeding with the additive manufacturing process at 160. Alternatively, responsive to the comparing at 145 indicating that the actual bulk flow rate differs from the desired bulk flow rate by greater than the threshold flow rate differential, methods 100 may include the executing the performing at 150 and subsequently executing the proceeding at 160.

The proceeding at 160 may include proceeding with any suitable additive manufacturing process in any suitable manner. As an example, the proceeding at 160 may include additive manufacturing a manufactured component within the enclosed chamber volume and/or utilizing the additive manufacturing process. As an additional example, the proceeding at 160 may include establishing the actual bulk flow rate of the process gas flow through the process chamber, with the actual bulk flow rate differing from the desired bulk flow rate by less than the threshold flow rate differential. An example of the additive manufacturing process includes laser powder bed fusion.

The proceeding at 160 may be performed with any suitable timing and/or sequence during methods 100. As examples, the proceeding at 160 may be performed subsequent to the initiating at 105, the configuring at 110, the validating at 115, the positioning at 120, the measuring at 130, the measuring at 135, the separating at 140, the comparing at 145, the performing at 150, and/or the archiving at 155. As additional examples, the proceeding at 160 may be performed at least partially concurrently with and/or subsequent to the controlling at 125.

An example of the proceeding at 160 is illustrated in FIG. 5. As illustrated therein, additive manufacturing system 10 is in the process of fabricating manufactured component 12 from feedstock material 52, which is supplied by feedstock material supply system 50.

Illustrative, non-exclusive examples of inventive subject matter according to the present disclosure are described in the following enumerated paragraphs:

A1. A method (100) of precisely regulating a process gas flow (22) through a process chamber (30), wherein the process chamber (30) defines an enclosed chamber volume (32), which contains an additive manufacturing process, a process gas inlet (40) to the enclosed chamber volume (32), and a process gas outlet (46) from the enclosed chamber volume (32), the method (100) comprising:

positioning (120) a removeable flow rate sensor (90) to measure an actual bulk flow rate of the process gas flow (22) through the process chamber (30);

utilizing a process control system (70) of the additive manufacturing process, controlling (125) the process gas flow (22) through the process chamber (30) to a desired bulk flow rate, wherein the controlling (125) includes establishing the actual bulk flow rate of the process gas flow (22) through the process chamber (30);

during the controlling (125) the process gas flow (22) through the process chamber (30), measuring (130), with the removeable flow rate sensor (90), the actual bulk flow rate of the process gas flow (22) through the process chamber (30);

subsequent to the measuring (130) the actual bulk flow rate, separating the removeable flow rate sensor (90) from the process chamber (30);

subsequent to the measuring (130), comparing (145) the actual bulk flow rate to the desired bulk flow rate; and one of:

(i) responsive to the actual bulk flow rate being within a threshold flow rate differential of the desired bulk flow rate, proceeding (160) with the additive manufacturing process; and (ii) responsive to the actual bulk flow rate differing from the desired bulk flow rate by greater than the threshold flow rate differential, performing (150) a corrective action and subsequently proceeding (160) with the additive manufacturing process.

A2. The method (100) of paragraph A1, wherein the positioning (120) the removeable flow rate sensor (90) includes positioning to measure all inflow (42) of the process gas flow (22) into the enclosed chamber volume (32) via the process gas inlet (40), optionally wherein the process chamber (30) includes a plurality of process gas inlets (40) and the positioning (120) the removeable flow rate sensor (90) includes positioning a corresponding removeable flow rate sensor (90) to measure a corresponding inflow (42) of the process gas flow (22) through each process gas inlet (40) of the plurality of process gas inlets (40).

A3. The method (100) of any of paragraphs A1-A2, wherein the positioning (120) the removeable flow rate sensor (90) includes positioning to measure all outflow (48) of the process gas flow (22) from the enclosed chamber volume (32) via the process gas outlet (46), optionally wherein the process chamber (30) includes a plurality of process gas outlets (46) and the positioning the removeable flow rate sensor (90) includes positioning a corresponding removeable flow rate sensor (90) to measure a corresponding outflow (48) of the process gas flow (22) through each process gas outlet (46) of the plurality of process gas outlets (46).

A4. The method (100) of any of paragraphs A1-A3, wherein the positioning (120) the removeable flow rate sensor (90) includes positioning a removeable duct (92) of the removeable flow rate sensor (90) to direct the process gas flow (22) through a bulk flow rate sensor (94) of the removeable flow rate sensor (90).

A5. The method (100) of any of paragraphs A1-A4, wherein the removeable flow rate sensor (90) includes a/the bulk flow rate sensor (94), optionally wherein the bulk flow rate sensor (94) includes a vane anemometer.

A6. The method (100) of any of paragraphs A1-A5, wherein the positioning (120) the removeable flow rate sensor (90) includes positioning a plurality of distinct removeable flow rate sensors (90).

A7. The method (100) of any of paragraphs A1-A6, wherein the controlling (125) the process gas flow (22) includes measuring a measured flow velocity of the process gas flow (22), utilizing a machine flow rate sensor (72) of the process control system (70), and regulating the process gas flow (22) to the desired bulk flow rate based, at least in part, on the measured flow velocity of the process gas flow (22).

A8. The method (100) of paragraph A7, wherein the measuring the measured flow velocity includes performing a point measurement of the measured flow velocity at a measurement location, or a single measurement location, at least one of within the process chamber (30), within the process gas inlet (40), and within the process gas outlet (46).

A9. The method (100) of any of paragraphs A7-A8, wherein the regulating the process gas flow (22) includes regulating with at least one of a valve, a flapper, and a pressure regulator.

A10. The method (100) of any of paragraphs A1-A9, wherein the controlling (125) the process gas flow (22) includes providing the process gas flow (22) to the process gas inlet and discharging the process gas flow (22) from the process gas outlet (46).

A11. The method (100) of any of paragraphs A1-A10, wherein the process gas flow (22) includes a process gas (24), optionally wherein the process gas (24) includes at least one of a shielding gas, a noble gas, helium, argon, and carbon dioxide, and further optionally wherein the process gas (24) at least substantially excludes at least one of atmospheric air and oxygen.

A12. The method (100) of any of paragraphs A1-A11, wherein the measuring (130) the actual bulk flow rate includes measuring all inflow (42) of the process gas flow (22) into the enclosed chamber volume (32) via the process gas inlet (40), optionally wherein the process chamber (30) includes a/the plurality of process gas inlets (40) and the measuring (130) the actual bulk flow rate includes measuring a corresponding actual bulk flow rate of a corresponding inflow (42) of the process gas flow (22) through each process gas inlet (40) of the plurality of process gas inlets (40).

A13. The method (100) of any of paragraphs A1-A12, wherein the measuring (130) the actual bulk flow rate includes measuring all outflow (48) of the process gas flow (22) from the enclosed chamber volume (32) via the process gas outlet (46), optionally wherein the process chamber (30) includes a/the plurality of process gas outlets (46) and the measuring the actual bulk flow rate includes measuring a corresponding actual bulk flow rate of a corresponding outflow (48) of the process gas flow (22) through each process gas outlet (46) of the plurality of process gas outlets (46).

A14. The method (100) of any of paragraphs A1-A13, wherein the measuring (130) the actual bulk flow rate includes measuring utilizing a/the vane anemometer.

A15. The method (100) of any of paragraphs A1-A14, wherein the measuring (130) the actual bulk flow rate includes measuring at least one of a volumetric flow rate of the process gas flow (22) and a mass flow rate of the process gas flow (22).

A16. The method (100) of any of paragraphs A1-A15, wherein the separating (140) the removeable flow rate sensor (90) from the process chamber (30) includes at least one of:

(i) demounting the removeable flow rate sensor (90) from the process chamber (30); and establishing a spaced-apart relationship between the removeable flow rate sensor (90) and the process chamber (30).

A17. The method (100) of any of paragraphs A1-A16, wherein the separating (140) the removeable flow rate sensor (90) includes separating a/the plurality of distinct removeable flow rate sensors (90) from the process chamber (30).

A18. The method (100) of any of paragraphs A1-A17, wherein the comparing (145) the actual bulk flow rate to the desired bulk flow rate includes determining at least one of:

(i) a difference between the actual bulk flow rate and the desired bulk flow rate; and (ii) an absolute value of the difference between the actual bulk flow rate and the desired bulk flow rate.

A19. The method (100) of any of paragraphs A1-A18, wherein the proceeding (160) with the additive manufacturing process includes additively manufacturing a manufactured component (12) within the enclosed chamber volume (32) and utilizing the additive manufacturing process.

A20. The method (100) of any of paragraphs A1-A19, wherein the additive manufacturing process includes a laser powder bed fusion additive manufacturing process.

A21. The method (100) of any of paragraphs A1-A20, wherein the performing (150) the corrective action includes performing a root-cause analysis to ascertain a cause for the actual bulk flow rate differing from the desired bulk flow rate by greater than the threshold flow rate differential.

A22. The method (100) of paragraph A21, wherein the performing (150) the corrective action further includes mitigating the cause.

A23. The method (100) of any of paragraphs A1-A22, wherein the performing (150) the corrective action includes adjusting a calibration of a/the machine flow rate sensor (72) of the process control system (70).

A24. The method (100) of any of paragraphs A1-A23, wherein, prior to the controlling (125) the process gas flow (22), the method (100) further includes initiating (105) evaluation of the additive manufacturing process.

A25. The method (100) of paragraph A24, wherein the initiating (105) evaluation includes initiating based, at least in part, on at least one of:

(i) initial setup of a new additive manufacturing system (10) that includes the process chamber (30) and performs the additive manufacturing process;

(ii) an elapsed manufacturing time for an existing additive manufacturing system (10) that includes the process chamber (30) and performs the additive manufacturing process;

(iii) initiation of a new additive manufacturing process that utilizes the desired bulk flow rate; and (iv) detection of an undesired defect in an additively manufactured component (12) manufactured utilizing the desired bulk flow rate of the process gas flow (22).

A26. The method (100) of any of paragraphs A24-A25, wherein the positioning (120) the removeable flow rate sensor (90) is responsive to the initiating (105) evaluation.

A27. The method (100) of any of paragraphs A1-A26, wherein, prior to the controlling (125) the process gas flow (22), the method (100) further includes configuring (110) the process chamber (30).

A28. The method (100) of paragraph A27, wherein the configuring (110) the process chamber (30) includes at least one of:

(i) cleaning the process chamber (30); and (ii) loading desired settings for the additive manufacturing process, wherein the desired settings include the desired bulk flow rate.

A29. The method (100) of any of paragraphs A1-A28, wherein, prior to the measuring (130) the actual bulk flow rate, and optionally prior to the positioning (120) the removeable flow rate sensor (90), the method (100) further includes at least one of:

(i) testing operation of the removeable flow rate sensor (90);

(ii) calibrating the removeable flow rate sensor (90); and (iii) certifying calibration of the removeable flow rate sensor (90).

A30. The method (100) of any of paragraphs A1-A29, wherein the method (100) further includes at least one of:

(i) archiving (155) the desired bulk flow rate;

(ii) archiving (155) the actual bulk flow rate;

(iii) archiving (155) a/the measured flow velocity of the process gas flow (22);

(iv) archiving (155) an identifier of the removeable flow rate sensor (90); and (v) archiving (155) the corrective action.

A31. The method (100) of any of paragraphs A1-A30, wherein the method (100) further includes measuring (135) a temperature of the process gas flow (22) utilizing a temperature sensor (96) of the removeable flow rate sensor (90).

A32. The method (100) of paragraph A31, wherein the measuring (130) the actual bulk flow rate includes measuring a/the volumetric flow rate of the process gas flow (22), and further wherein the method (100) includes calculating a/the mass flow rate of the process gas flow (22) based, at least in part, on the temperature of the process gas flow (22) and the volumetric flow rate of the process gas flow (22).

B1. An additive manufacturing system (10) configured to additively manufacture a manufactured component (12), the additive manufacturing system (10) comprising one or more of:

a process gas source (20) configured to provide a process gas flow (22) of a process gas (24);

a process chamber (30) that defines an enclosed chamber volume (32), a process gas inlet (40) configured to receive an inflow (42) of the process gas (24) into the enclosed chamber volume (32), and a process gas outlet (46) configured to discharge an outflow (48) of the process gas (24) from the enclosed chamber volume (32);

a feedstock material supply system (50) configured to supply a feedstock material (52) within the enclosed chamber volume (32);

an energy source (60) configured to fuse the feedstock material (52), within the enclosed chamber volume (32), to define the manufactured component (12);

a removeable flow rate sensor (90) configured to measure a bulk flow rate of the process gas flow (22) through the process chamber (30), optionally wherein the removeable flow rate sensor (90) includes a bulk flow rate sensor (94), optionally wherein the removeable flow rate sensor (90) includes a removeable duct (92) configured to direct the process gas flow (22) through the bulk flow rate sensor (94), optionally wherein the bulk flow rate sensor (94) is positioned within the enclosed chamber volume (32), and further optionally wherein the removeable flow rate sensor (90) includes a temperature sensor (96) configured to measure a temperature of the process gas flow (22);

a process control system (70) that includes a machine flow rate sensor (72) configured to measure a measured flow velocity of the process gas flow (22); and a data acquisition unit (74), optionally wherein the data acquisition unit (74) includes computer-readable storage media (76), and further optionally wherein the data acquisition unit (74) and the process control system (70) together are programmed to control operation of the additive manufacturing system (10) according to any suitable step and/or steps of any of the methods (100) of any of paragraphs A1-A32.

B2. The additive manufacturing system (10) of paragraph B1, wherein the additive manufacturing system (10) further includes any suitable structure, function, and/or feature disclosed in any suitable subset of any of the methods (100) of any of paragraphs A1-A32, C1. Non-transitory computer-readable storage media (76) including computer-executable instructions that, when executed, direct an additive manufacturing system (10) to perform any suitable step and/or steps of any of the methods (100) of any of paragraphs A1-A32.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

The invention claimed is:

1. A method of precisely regulating a process gas flow through a process chamber, wherein the process chamber defines an enclosed chamber volume, which contains an additive manufacturing process, a process gas inlet to the enclosed chamber volume, and a process gas outlet from the enclosed chamber volume, the method comprising:

positioning a removeable flow rate sensor to measure an actual bulk flow rate of the process gas flow through the process chamber;

utilizing a process control system of the additive manufacturing process, controlling the process gas flow through the process chamber to a desired bulk flow rate, wherein the controlling includes establishing the actual bulk flow rate of the process gas flow through the process chamber;

during the controlling the process gas flow through the process chamber, measuring, with the removeable flow rate sensor, the actual bulk flow rate of the process gas flow through the process chamber;

subsequent to the measuring the actual bulk flow rate, separating the removeable flow rate sensor from the process chamber;

subsequent to the measuring, comparing the actual bulk flow rate to the desired bulk flow rate; and one of:

(i) responsive to the actual bulk flow rate being within a threshold flow rate differential of the desired bulk flow rate, proceeding with the additive manufacturing process; and (ii) responsive to the actual bulk flow rate differing from the desired bulk flow rate by greater than the threshold flow rate differential, performing a corrective action and subsequently proceeding with the additive manufacturing process.

2. The method of claim 1, wherein the positioning the removeable flow rate sensor includes positioning to measure all inflow of the process gas flow into the enclosed chamber volume via the process gas inlet.

3. The method of claim 1, wherein the positioning the removeable flow rate sensor includes positioning to measure all outflow of the process gas flow from the enclosed chamber volume via the process gas outlet.

4. The method of claim 1, wherein the positioning the removeable flow rate sensor includes positioning a plurality of distinct removeable flow rate sensors.

5. The method of claim 4, wherein the separating the removeable flow rate sensor includes separating the plurality of distinct removeable flow rate sensors from the process chamber.

6. The method of claim 1, wherein the controlling the process gas flow includes measuring a measured flow velocity of the process gas flow, utilizing a machine flow rate sensor of the process control system, and regulating the process gas flow to the desired bulk flow rate based, at least in part, on the measured flow velocity of the process gas flow.

7. The method of claim 6, wherein the measuring the measured flow velocity includes performing a point measurement of the measured flow velocity at a single measurement location at least one of within the process chamber, within the process gas inlet, and within the process gas outlet.

8. The method of claim 1, wherein the controlling the process gas flow includes providing the process gas flow to the process gas inlet and discharging the process gas flow from the process gas outlet.

9. The method of claim 1, wherein the measuring the actual bulk flow rate includes measuring all inflow of the process gas flow into the enclosed chamber volume via the process gas inlet.

10. The method of claim 1, wherein the measuring the actual bulk flow rate includes measuring all outflow of the process gas flow from the enclosed chamber volume via the process gas outlet.

11. The method of claim 1, wherein the measuring the actual bulk flow rate includes measuring at least one of a volumetric flow rate of the process gas flow and a mass flow rate of the process gas flow.

12. The method of claim 1, wherein the separating the removeable flow rate sensor from the process chamber includes demounting the removeable flow rate sensor from the process chamber.

13. The method of claim 1, wherein the proceeding with the additive manufacturing process includes additively manufacturing a manufactured component within the enclosed chamber volume utilizing the additive manufacturing process.

14. The method of claim 1, wherein the performing the corrective action includes performing a root-cause analysis to ascertain a cause for the actual bulk flow rate differing from the desired bulk flow rate by greater than the threshold flow rate differential.

15. The method of claim 14, wherein the performing the corrective action further includes mitigating the cause.

16. The method of claim 1, wherein the performing the corrective action includes adjusting a calibration of a machine flow rate sensor of the process control system.

17. The method of claim 1, wherein, prior to the measuring the actual bulk flow rate, the method further includes at least one of:

(i) testing operation of the removeable flow rate sensor;

(ii) calibrating the removeable flow rate sensor; and (iii) certifying calibration of the removeable flow rate sensor.

18. The method of claim 1, wherein the method further includes measuring a temperature of the process gas flow utilizing a temperature sensor of the removeable flow rate sensor.

19. The method of claim 18, wherein the measuring the actual bulk flow rate includes measuring a volumetric flow rate of the process gas flow, and further wherein the method includes calculating a mass flow rate of the process gas flow based, at least in part, on the temperature of the process gas flow and the volumetric flow rate of the process gas flow.

20. The method of claim 1, wherein the method further includes at least one of:

(i) archiving the desired bulk flow rate;

(ii) archiving the actual bulk flow rate;

(iii) archiving a measured flow velocity of the process gas flow;

(iv) archiving an identifier of the removeable flow rate sensor; and (v) archiving the corrective action.

* * * * *